(12) United States Patent
Rose et al.

(10) Patent No.: US 8,500,380 B2
(45) Date of Patent: Aug. 6, 2013

(54) WASHER

(75) Inventors: Douglas L. Rose, Sherman, CT (US);
Alan J. Armiento, New Rochelle, NY (US)

(73) Assignee: Black & Decker Inc., Newark, DE (US)

( * ) Notice: Subject to any disclaimer, the term of this patent is extended or adjusted under 35 U.S.C. 154(b) by 352 days.

(21) Appl. No.: 12/721,941

(22) Filed: Mar. 11, 2010

(65) Prior Publication Data

US 2011/0222990 A1    Sep. 15, 2011

(51) Int. Cl.
*F16B 15/00*        (2006.01)

(52) U.S. Cl.
USPC .......................................... 411/441; 411/531

(58) Field of Classification Search
USPC ................. 411/441, 531, 536, 533, 545, 440, 411/539, 544, 943, 136, 155; 227/55
See application file for complete search history.

(56) References Cited

U.S. PATENT DOCUMENTS

| | | | |
|---|---|---|---|
| RE15,761 E * | 2/1924 | Rose .............................. | 411/350 |
| 2,555,291 A * | 5/1951 | Poupitch ........................ | 411/549 |
| 3,137,195 A * | 6/1964 | Rosenberg, Jr. ............... | 411/441 |
| 3,181,584 A * | 5/1965 | Borowsky ....................... | 411/134 |
| 3,687,184 A * | 8/1972 | Wagner ......................... | 411/135 |
| 4,519,175 A * | 5/1985 | Resan ............................. | 52/713 |
| 4,571,133 A * | 2/1986 | Lindow .......................... | 411/11 |
| 4,744,187 A * | 5/1988 | Tripp ............................. | 52/410 |
| 4,862,664 A * | 9/1989 | Romine ......................... | 52/410 |
| 5,250,058 A * | 10/1993 | Miller et al. .................. | 606/154 |
| 6,352,398 B1 * | 3/2002 | Gonnet ......................... | 411/441 |
| 7,182,565 B2 * | 2/2007 | Buytaert et al. .............. | 411/441 |
| 8,066,463 B2 * | 11/2011 | Georges ........................ | 411/441 |

* cited by examiner

*Primary Examiner* — Gary Estremsky
(74) *Attorney, Agent, or Firm* — Cantor Colburn LLP

(57) ABSTRACT

A washer for a fastener system includes a washer body and a through opening in the washer body configured to allow passage of a fastener tip therethrough. A retention feature is operably connected to the washer body and configured to retain the washer to an inner surface of a setting tool barrel. A method for securing a fastener to a workpiece includes retaining a washer to an inner surface of a barrel of a setting tool and discharging a fastener from the setting tool. A tip of the fastener extends through a through opening in the washer into the workpiece. A head of the fastener is urged into contact with the washer thereby releasing the washer from the setting tool.

7 Claims, 3 Drawing Sheets

WASHER

BACKGROUND

The subject matter disclosed herein relates to setting tools. More particularly, the subject invention relates to fastener systems discharged from setting tools.

Setting tools are useful for jobs which require setting of a large number of fasteners Commonly, such tools are utilized to set fasteners into a variety of materials. The setting tools discharge the fasteners at a high speed and exert a high degree of force on the material into which the fasteners are driven. The exerted force and fastener speed results in damage to some materials into which the fasteners are driven. The art would well receive a fastener system which reduces damage to the material into which the fasteners are driven.

BRIEF DESCRIPTION

Disclosed is a washer for a fastener system including a washer body and a through opening in the washer body configured to allow passage of a fastener tip therethrough. A retention feature is operably connected to the washer body and configured to retain the washer to an inner surface of a setting tool barrel.

Also disclosed is a method for securing a fastener to a workpiece. The method includes retaining a washer to an inner surface of a barrel of a setting tool and discharging a fastener from the setting tool. A tip of the fastener extends through a through opening in the washer into the workpiece. A head of the fastener is urged into contact with the washer thereby releasing the washer from the setting tool.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
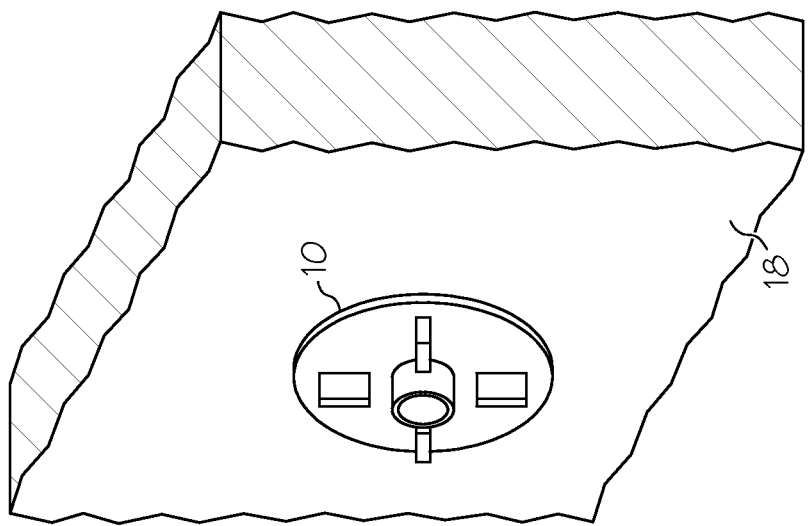
FIG. 1 is a perspective view of an embodiment of a fastener setting tool.
Figure 1:
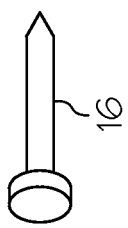
Figure 1:
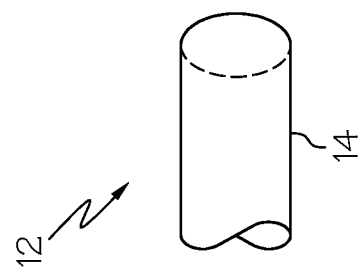

Shown in FIG. 1 is an embodiment of a washer 10, utilized in conjunction with a fastener setting tool 12. The setting tool 12 includes a barrel 14 from which a fastener 16 is discharged into a workpiece 18. To reduce damage to the workpiece 18 from the impact of the fastener 16 into the workpiece 18, the washer 10 is utilized. The washer 10 reduces a velocity of the fastener 16 into the workpiece 18 and distributes an impact force of the fastener 16 over a larger area of the workpiece 18.

Figure 2:
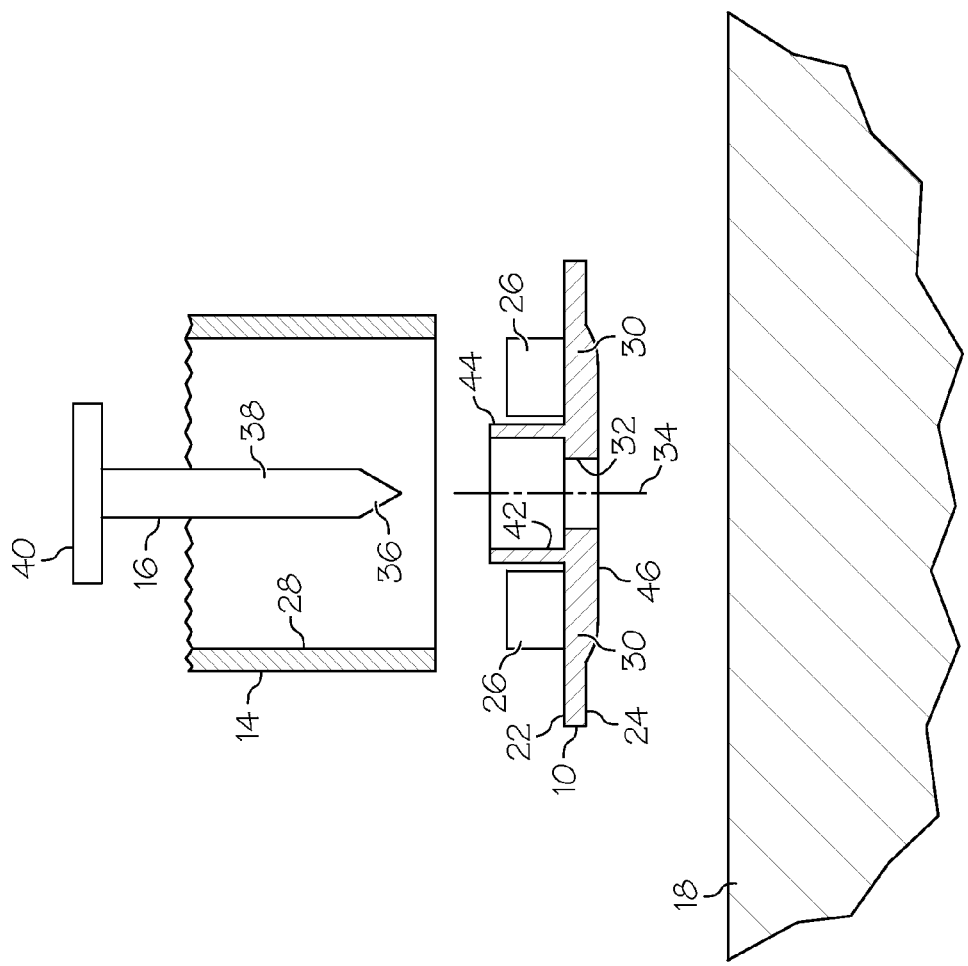
FIG. 2 is a cross-sectional view of an embodiment of a washer.

Referring now to FIG. 2, the washer 10 includes a tool-side surface 22 closest the barrel 14, and a workpiece-side surface 24 closest to the workpiece 18. A number of retention features, in some embodiments, ribs 26 are disposed at the tool-side surface 22. The ribs 26 are configured to engage an inner surface 28 of the barrel 14 to retain the washer 10 to the barrel 14 until the fastener 16 is discharged. As shown in FIG. 2, in some embodiments, the ribs 26 extend laterally along the tool-side surface 22 and axially away from the tool-side surface 22 such that a lateral extent 30 of each rib 26 is equal to or slightly less than the inner surface 28 of the barrel 14 to allow for insertion of the ribs 26 into the barrel 14, while still retaining the washer 10 to the barrel 14. In some embodiments, there is an interference fit between the ribs 14 and the inner surface 28 of the barrel 14. The embodiment of FIG. 2 includes four ribs 26, but it is to be appreciated that any suitable number of ribs 26 may be utilized, for example, three, five or six ribs 26. The washer 10 includes an opening 32, in some embodiments located at a center 34 of the washer 10. The opening 32 is large enough to allow a tip 36 and a shank 38 of the fastener 16 to pass therethrough, but is sized to prevent passage of a fastener head 40 through the opening 32.

In some embodiments, the washer 10 includes a sleeve 42 extending from the tool-side surface 22. The sleeve 42 is concentric with the opening 32 and guides the fastener 16 through the opening 32. The ribs 26 are arranged around an exterior 44 of the sleeve 42 and, in some embodiments, extend laterally outwardly from the sleeve 42.

The workpiece-side surface 24 is configured to distribute the impact force of the fastener 16 over a broad area. In some embodiments, the workpiece-side surface 24 includes a convex protrusion 46 which may be concentric with the opening 32 to slow the velocity of the fastener 16 and to distribute the impact force.

Figure 3:
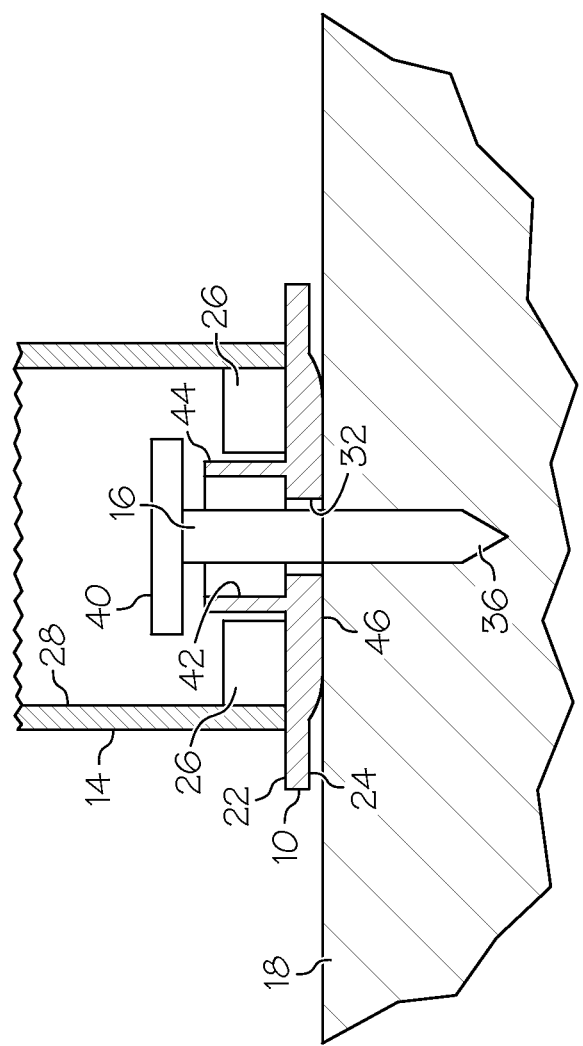
FIG. 3 is a cross-sectional view of an embodiment of a setting tool and washer.

As shown in FIG. 3, the washer 10 is secured to the setting tool 12 by inserting the ribs 26 into the barrel 14 and the setting tool 12 and washer 10 are positioned over the workpiece 18. When the fastener 16 is discharged, the tip 36 and shank 38 pass through the opening 32 and into the workpiece 18, securing the fastener 16 and the washer 10 to the workpiece 18. As the fastener 16 travels through the opening 32, the fastener head 40 impacts the ribs 26 and/or the sleeve 42 to detach the washer 10 from the setting tool 12. The fastener head 40 forces at least a portion of the workpiece-side surface 24 of the washer 10 into contact with the workpiece 18. Once the fastener head 40 contacts the ribs 26 and/or the sleeve 42, the velocity of the fastener 16 into the workpiece 18 is reduced by the ribs 26 and/or the sleeve 42. In some embodiments, the ribs 26 and/or the sleeve 42 are configured to be crushed by the fastener head 40 to even further reduce the velocity of the fastener 16.

Reducing the velocity of the fastener 16 by the ribs 26 and the sleeve 42 reduces damage to the workpiece 18 from impact of the fastener 16 thereinto. Further, the washer 10 impacting the workpiece 18 instead of the fastener head 40 distributes the impact force of the fastener 16 of a larger area thereby reducing damage to the workpiece 18 from the impact force of the fastener 16.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A washer for a fastener system comprising:
    a washer body having a tool side surface and a workpiece side surface;
    a through opening in the washer body configured to allow passage of a fastener tip therethrough; and
    a retention feature operably connected to the washer body, the retention feature having an outer generally squared surface that extends substantially perpendicularly from the tool side surface of the washer body, the outer generally squared surface being configured to retain the washer to an inner surface of a setting tool barrel, wherein the workpiece side surface of the washer body includes a convex portion.

2. The washer of claim 1 wherein the retention feature comprises one or more ribs.

3. The washer of claim 2 wherein the one or more ribs are arranged around the through opening.

4. The washer of claim 1 wherein the retention feature is at least partially crushable by the fastener.

5. The washer of claim 1, further comprising a sleeve extending from the washer body surrounding the through opening.

6. The washer of claim 5 wherein the sleeve is at least partially crushable by the fastener.

7. The washer of claim 5 wherein the sleeve is substantially concentric with the through opening.

\* \* \* \* \*